UNITED STATES PATENT OFFICE.

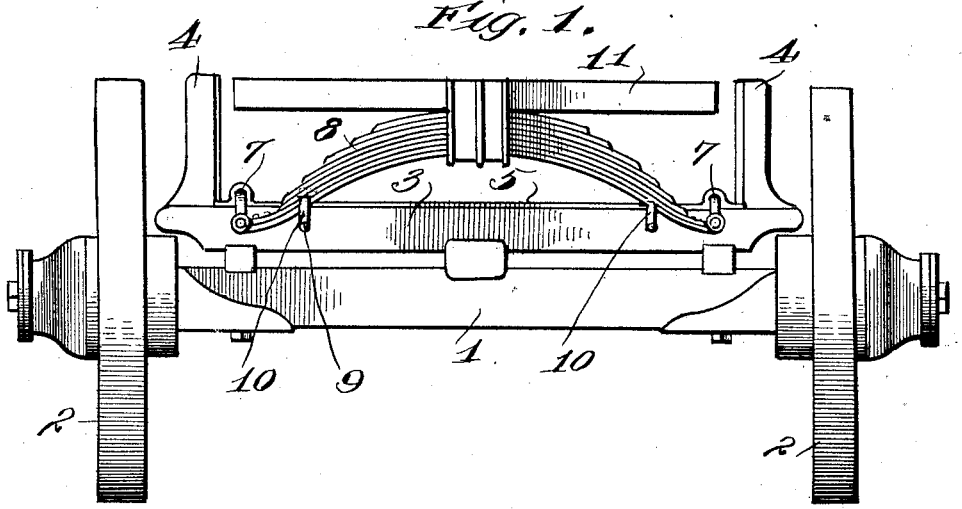
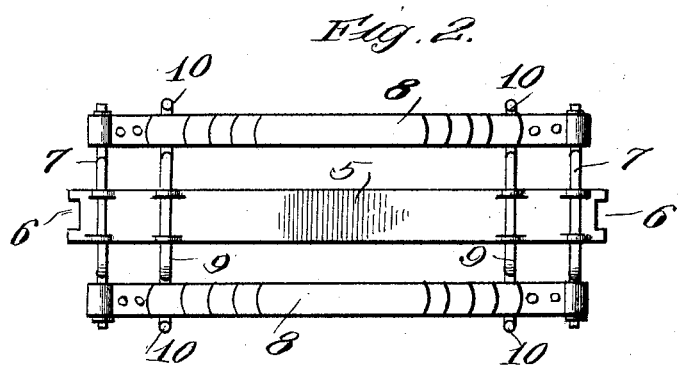
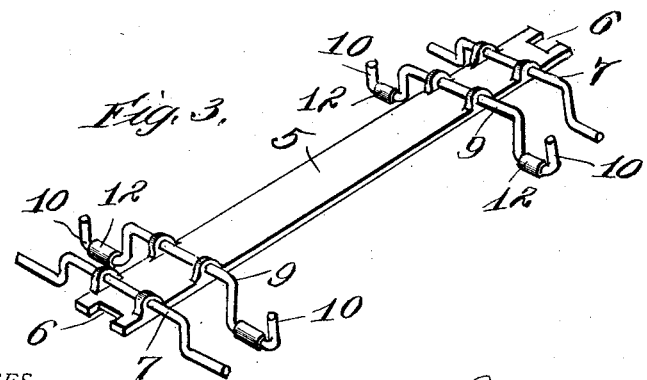

JOSEPH H. SMITH, OF DECOTO, CALIFORNIA.

SPRING UNIT.

1,037,556.  Specification of Letters Patent.  Patented Sept. 3, 1912.

Application filed November 11, 1911. Serial No. 659,810.

*To all whom it may concern:*

Be it known that I, JOSEPH H. SMITH, a citizen of the United States, residing at Decoto, in the county of Alameda and State of California, have invented certain new and useful Improvements in Spring Units, of which the following is a specification.

The average farm wagon is a springless vehicle and it frequently happens that the farmer is desirous of using a spring vehicle. Numerous devices have been constructed to convert the springless vehicle into a spring vehicle with more or less success.

The object of my invention is to provide a self-contained spring bolster, shackles for the ends of the springs and shackles to relieve the ends of the springs from unusual loads and a spacing member to properly position and maintain the shackles in such position so that the entire device may be placed upon or removed from the vehicle as a unit; and with this and minor objects in view, my invention consists of the parts and combinations of parts as will be hereinafter more fully set forth.

In the drawing, Figure 1 is a rear elevation of a wagon with the body removed and my invention in position; Fig. 2 is a top plan view illustrating my invention; and Fig. 3 is a perspective view of the spring stop provided with cushions.

1 represents a suitable axle mounted on wheels 2, 3 is a bolster of usual construction, having the body standards 4.

5 is a flat steel bar or plate, the ends of which are notched as at 6, whereby said bar is adapted to be detachably fixed on the bolster by reason of the body standards 4 entering the recesses or slots 6.

7 are shackles pivotally mounted on the spacing member or bar 5 and provided with two arms on which the ends of the springs 8 are pivotally mounted. It will be noted that I employ two springs, one on each side of the bolster. It will also be noted that the shackle is of the two-crank type, thereby providing for the mounting of two parallel springs.

It frequently occurs that a wagon is overloaded and that the springs are subjected to sudden strains due to the wheels encountering ruts and projections in the road, which frequently result in snapping the ends of the spring. To overcome this I mount spring protectors 9 on the spacing member, said protectors having suitable depending arms or stops 10. These spring stops or protectors are mounted in a fixed relation with the spring shackles 7 and this relation is determined by the manufacturer, who knows the strength of the spring, so that this relation between the ends of the spring and the protector cannot be accidentally changed.

It is my purpose to manufacture and sell as a unit the spacing member 5, the springs 8 mounted thereon by means of the shackle 7 and the spring stops 9 together with the body bolster 11, so that when it is desired to provide the usual farm wagon with springs, all that is necessary is to slip the spacing member 5 between the body standards 4, between which it is firmly locked on the bolster by means of the body standards engaging the recesses 6. By furnishing my invention as a unit, the definite relation between the ends of the springs and the spring stop is maintained against accidental displacement, and this relation is determined by the manufacturer who knows the strength of the spring and is therefore in a position to judge as to the distance the stops or protectors should be spaced from the ends of the spring in order to secure the best possible results to relieve the ends of the spring when the wagon is heavily loaded. By this arrangement, one is able to carry a load far beyond the capacity of the spring, and the spring is protected when the wheel drops in a low place in the road or rides over an obstruction, inasmuch as the spring cannot give further than the protectors will permit. By the use of my invention, the crystallization and bending or breaking of the ends of the springs is eliminated.

It is obvious, as shown in Fig. 3, that the arms of the stops may be provided with leather or rubber cushions 12.

I claim:—

1. A spring unit comprising a spacing member constructed to be detachably secured to a bolster, springs mounted on said spacing member and stops secured to said spacing member in fixed relation to and between the ends of the springs.

2. A spring unit including a spacing member adapted to be detachably connected to a bolster, spring shackles pivotally mounted on said spacing member and spring stops fixed on said spacing member in fixed relation to and between the spring shackles.

3. In a detachable spring unit for vehicles, the combination with a spacing member having notched ends adapted to engage the body standards of a vehicle, shackles pivotally mounted on said member near its ends, springs secured to said shackles, stops for said springs secured to said spacing member in fixed relation to and between the spring shackles, and a body bolster mounted on said springs.

4. In a detachable spring unit for vehicles, the combination with a spacing member having notched ends adapted to engage body standards of a vehicle, spring shackles secured to said member at each end thereof, and spring stops secured to the spacing member and positioned between the spring shackles and springs secured at their ends to said shackles said stops being constructed to engage the springs at points intermediate their ends.

5. In a detachable spring unit for vehicles, the combination with a spacing member constructed to engage body standards of a vehicle, spring shackles secured to the ends of the spacing member, stop shackles secured to the spacing member between the spring shackles and in fixed relation to the spring shackles, springs secured at their ends to said spring shackles; said stop shackles being positioned in the path of the springs as they move under compression and constitute a supplemental bearing for the springs after they have been loaded to a predetermined degree.

The foregoing specification signed at Decoto, California, this 21st day of October, 1911.

JOSEPH H. SMITH.

In presence of—
T. S. FEREIRA,
M. CORRIEA.

Copies of this patent may be obtained for five cents each, by addressing the "Commissioner of Patents, Washington, D. C."